United States Patent [19]

Aki et al.

[11] Patent Number: 5,251,078
[45] Date of Patent: Oct. 5, 1993

[54] TAPE POSITION DETECTING DEVICE THAT COMPARES AND SELECTS BETWEEN TWO MODES OF DETECTING THE TAPE POSITION

[75] Inventors: Ichiro Aki; Toshiaki Kojima, both of Kanagawa, Japan

[73] Assignee: Sony Corporation, Japan

[21] Appl. No.: 671,094

[22] Filed: Mar. 18, 1991

[30] Foreign Application Priority Data

Mar. 28, 1990 [JP] Japan .................................. 2-79919

[51] Int. Cl.⁵ ............................................. G11B 15/18
[52] U.S. Cl. .................................. 360/72.2; 360/74.4
[58] Field of Search ......................... 360/72.2, 74.4, 49

[56] References Cited

U.S. PATENT DOCUMENTS

| 4,953,040 | 8/1990 | Hedtke et al. | 360/72.2 X |
| 5,016,119 | 5/1991 | Ogawa et al. | 360/72.2 X |

Primary Examiner—Joseph L. Dixon
Assistant Examiner—David L. Robertson
Attorney, Agent, or Firm—Ronald P. Kananen

[57] ABSTRACT

In the tape position detecting device, the relative position data and absolute position data of the reference points are stored, and with respect to an arbitrary point, the first tape position data is detected by using the relative position data. The tape movement data from a reference point to the arbitrary point which is obtained using the absolute position data is added to the absolute position data of the reference point to detect the second tape position data. Depending on the difference between the first and second tape position data, the first or second tape position data is transmitted as the tape position data output. Hence, with the tape position detecting device, the tape position data can be detected much more accurately than with the conventional device in which it is detected by using the relative position data or absolute position data only.

5 Claims, 4 Drawing Sheets

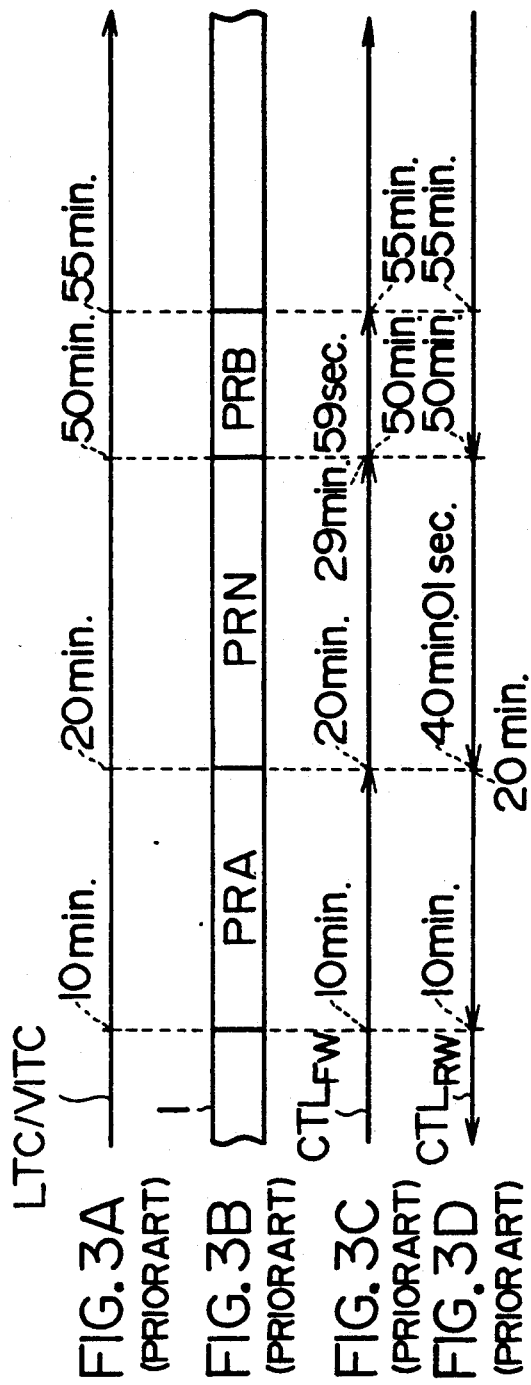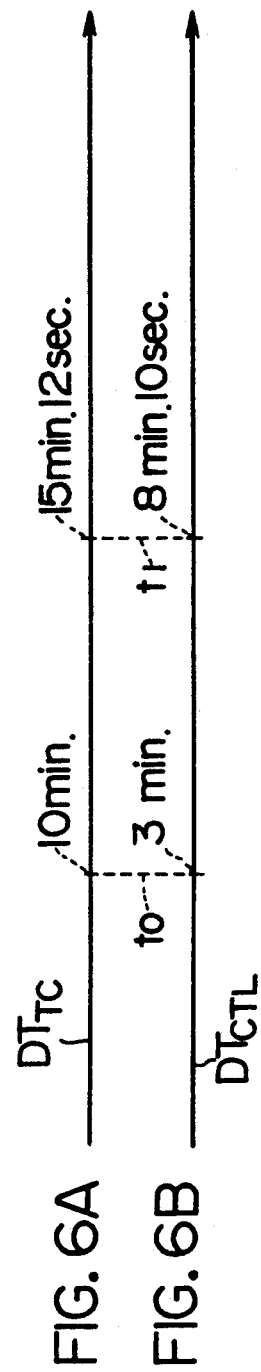

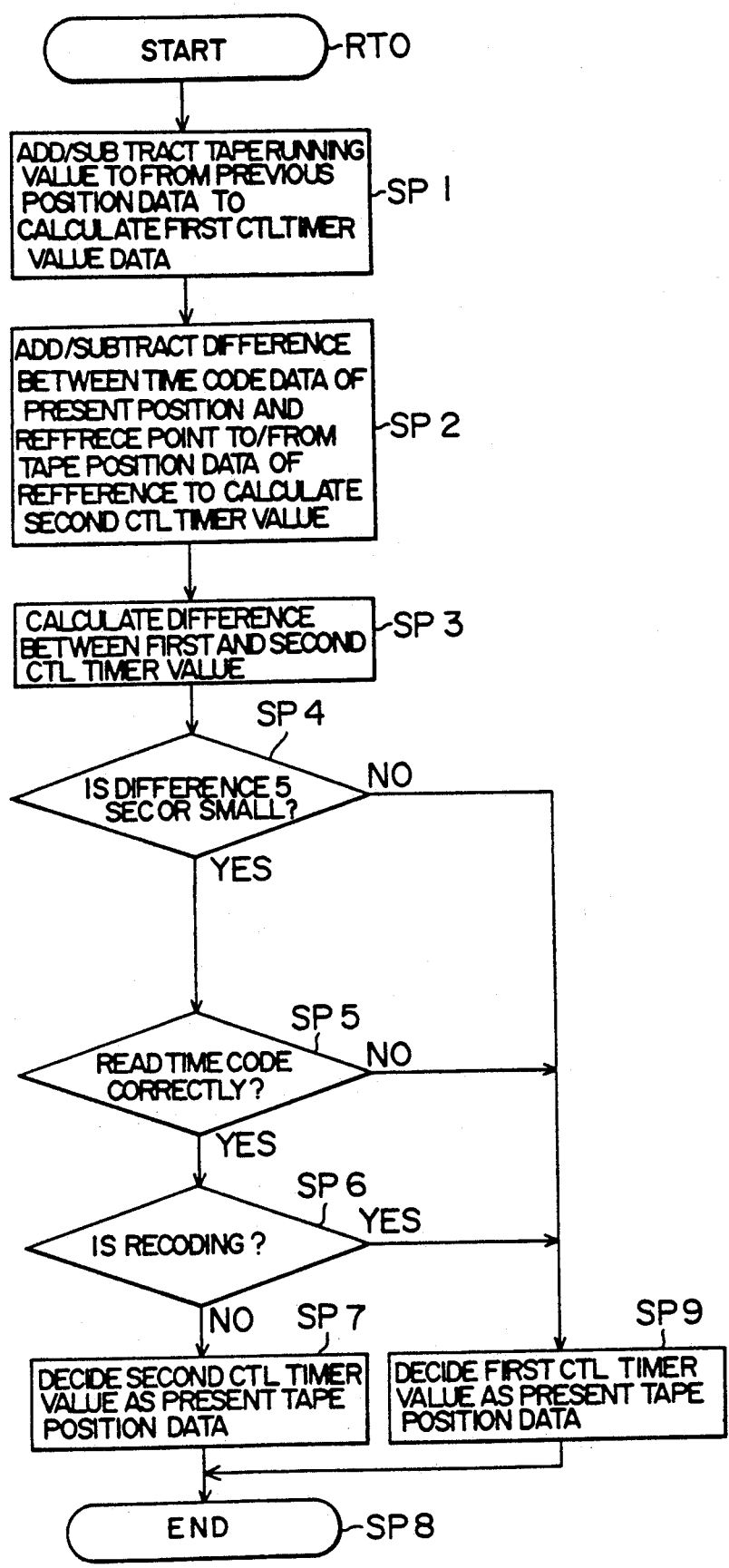

TAPE POSITION DETECTING DEVICE THAT COMPARES AND SELECTS BETWEEN TWO MODES OF DETECTING THE TAPE POSITION

BACKGROUND OF THE INVENTION

This invention relates to a tape position detecting device which is suitable for detection of the position of a magnetic tape, for instance, in a cuing operation with a video tape recorder.

In the case where signals are to be recorded on a magnetic tape or reproduced therefrom with a video tape recorder, it is necessary to detect a magnetic tape position; that is, it is necessary to perform a so-called "cuing operation". For this purpose, there are available a variety of tape position detecting devices employing various tape position detecting methods.

A first tape position detecting method is as follows: As shown in FIG. 1, a time code track TC is formed on a magnetic tape 1 in a longitudinal direction, and a time code LTC representing the absolute position of a record track TR on the magnetic tape 1 using, for instance, hours-minutes-seconds and frame number is recorded on the time code track TC. In the cuing operation, the time code LTC is reproduced from the track TC to detect the tape position.

A second tape position detecting method is as folows: A time code VITC including hours-minutes-seconds and a frame number is superposed on the vertical flyback time part of the video signal recorded on a record track TR of the magnetic tape 1, instead of the time code track TC. In the cuing opertion, the time code VITC is separated from the signal which is reproduced from the record track TR, to detect the tape position.

In a third tape position detecting method, the time code is not used, and instead means for mechanically detecting an amount of movement of a magnetic tape (hereinafter referred to as "tape movement detecting means", when applicable) by utilizing a capstan for driving the magnetic tape, a reel frequency signal, or a timer roller provided for this purpose only is employed to detect a relative tape position of the magnetic tape 1.

In the third tape position detecting method, sometimes a so-called "CTL timer" is employed. That is, CTL pulse signals recorded regularly on the control track CT formed longitudinally on the magnetic tape 1 are utilized to increase the accuracy of detection of the tape movement detecting means.

In practice, as shown in FIG. 2, a magnetic tape 1 is supplied from a supply reel 2A in a tape cassette 2, and is wound on a drum 6 with the aid of first and second inclination guide after passing through a guide pin 3A, a tension regulator pin 4, and a guide pins 3B, 5A and 5B. Thereafter, the magnetic tape 1, while being abutted against a time code recording and reproducing TC head 7 and a control track recording and reproducing CTL head 8 and engaged by a capstan 9A and a pinch roller 9B, is moved on, so that it is wound on a take-up reel 2B while being guided by guide pins 3C and 3D. Thus, the magnetic tape 1 supplied from the tape cassette 2 has been loaded in the tape recorder.

Under this condition, in the first tape position detecting method, the time code LTC is recorded on and reproduced from the time code track TC of the magnetic taped 1 with the TC head 7.

In the second tape position detecting method, the time code VITC is recorded on and reproduced from the record track TR of the magnetic tape 1 with rotary heads 6A and 6B positioned over the drum 6.

In the third tape position detecting method, the CTL pulse signal is reproduced with the CTL head 8, and frequency signals obtained from the capstan 9A and the reels 2A and 2B are applied to the tape movement detecting means.

The first and second tape position detecting methods using the time codes LTC and VITC recorded on the magnetic tape 1 are advantageous in that the absolute position of the magnetic tape 1 can be detected with high accuracy. However, the methods are still disadvantageous in that, since the operator can specify the time code LTC or VITC, the continuity of the time code LTC/VITC is not assured, and sometimes it is impossible to detect the relative position of the magnetic tape 1.

In addition, the methods give rise to another problem that, during the ordinary operation in which reproducing signals can be positively obtained from the magnetic tape 1, the absolute position of the magnetic tape 1 can be detected with high accuracy, but in the case where the magnetic tape 1 is subject to high speed signal reproduction or low speed reproduction, the time code itself cannot be reproduced with the result that the tape position of the magnetic tape 1 cannot be detected.

The tape position detecting methods cannot be employed at all in the case where the time code LTC/VITC has not been recorded on the magnetic tape 1.

In the third tape position detecting method using the so-called "CTL timer", it is impossible to detect the absolute position of the magnetic tape 1 since no means for detecting an absolute position is provided.

On the other hand, the absolute position of the magnetic tape 1 may be erroneous because of the slip of the capstan 9A or the reel 2A or 2B or because of an error in reading the CTL pulse signal; however, it may be detected no matter when signals are not recorded on the magnetic tape or no matter how the operating condition is.

In view of the foregoing, a tape position detecting device employing a fourth tape position detecting method has been proposed in the art. In the fourth tape position detecting method, during the ordinary operation, tape position data is detected using the time code LTC/VITC recorded on the magnetic tape 1; and in the case where the time code LTC/VITC cannot be obtained because signals have not been recorded on the magnetic tape 1 or because the operating condition is not suitable, the time code LTC/VITC is interpolated with the output value of the CTL timer, thereby to detect the tape position data.

In the tape position detecting device thus constructed, the output value of the CTL timer is an auxiliary value as a general rule. Therefore, with the timing that the time code LTC/VITC is read, instead of the tape position data interpolated with the output value of the CTL timer, a value corresponding to the time code LTC/VITC thus read is outputted as correct tape position data.

As a result, in the case where, as shown in FIGS. 3A and 3B, a record region PRN of ten minutes in which no time code LTC/VITC is recorded is present between a record region PRA of ten minutes (from 10 minutes to 20 minutes) and a record region PRB of five minutes (from 50 minutes to 55 minutes) in which the time code LTC/VITC are recorded, two substantially different values of tape position data may be arrived at for the same position on the magnetic tape 1. This fact adversely affects the cuing operation.

As shown in FIG. 3C, the output value $CTL_{FW}$ provided by the CTL timer when the cuing operation is carried out with the magnetic tape in the forward direction is a time of ten minutes (from 10 minutes to 20 minutes) in correspondence to the time code LTC/VITC when the record region PRA is subjected to reproduction; and then is a time of twenty minutes to twenty-nine minutes and fifty-nine seconds with the ten minutes interpolated when the record region PRN is subjected to reproduction. Thereafter, the output value is renewed with the timing that the reproduction of the record region PRB is started, so that it is a time of five minutes (from 50 minutes to 55 minutes) corresponding to the time code LTC/VITC.

In contrast, as shown in FIG. 3D, the output value $CTL_{RW}$ provided by the CTL timer when the cuing operation is carried out with the magnetic tape in the reverse direction has a value of five minutes (from 55 minutes to 50 minutes) corresponding to the time code LTC/VITC when the record region PRB is subjected to reproduction; and then has a value of fifty minutes to forty minutes one second with the ten minutes interpolated when the record region PRN is subjected to reproduction. Thereafter, the output value is renewed with the timing that the record region PRA is subjected to reproduction, so that it has a value of ten minutes (from 20 minutes to 10 minutes) corresponding to the time code LTC/VITC.

As is apparent from the above description, the value of the CTL timer, which is provided by interpolation of the record region PRN of ten minutes in which no time code LTC/VITC is recorded, shows different values—twenty minutes to twenty-nine minutes and fifty-nine seconds, and fifty minutes to forty minutes and one second—depending on the cuing directions. Hence, it is impossible to correctly detect the tape position data for cuing.

Furthermore, even in the case where the time code LTC/VITC on the magnetic tape can be read without fail, the continuity of the time code LTC/VITC is not assured. Hence, in order to perform the cuing operation correctly at all times, it is essential that the time code LTC/VITC is provided on the magnetic tape 1 in correspondence to the aimed tape position, and with respect to the direction of movement of the magnetic tape 1 the time code LTC/VITC increase or decrease monotonously. Thus, the conventional tape position detecting device is still insufficient in practical use.

The above-described difficulties may be eliminated by employing the third tape position detecting method in which the value of the CTL timer is utilized for the cuing operation. However, since the CTL timer employs mechanical detecting means to detect tape position data, the error due to the expansion of the magnetic tape 1 or the slip of the magnetic tape 1 on the capstan 9A cannot be prevented.

An additional problem is that, since only the CTL pulse signal is employed, the absolute position data of the magnetic tape 1 cannot be detected, and the detection error of the CTL pulse signal is accumulated. Thus, the method is inferior in the accuracy of tape position data than the above-described tape position detecting methods.

Furthermore, in the case where the magnetic tape 1 is moved repeatedly in the forward direction and in the reverse direction, the detection of tape position data is lowered in accuracy. Thus, the conventional methods are not sufficiently effective in solving the above-described problems.

SUMMARY OF THE INVENTION

In view of the foregoing, an object of this invention is to provide a tape position detecting device in which the above-described difficulties have been eliminated. More specifically, an object of the invention is to provide a tape position detecting device which is capable of detecting tape position data with high accuracy at all times.

The foregoing object and other objects of the invention has been achieved by the provision of a tape position detecting device which comprises: relative position detecting means 8, 9A and 11 for detecting an amount of movement of a tape-shaped recording medium 1, and providing relative position data $DT_{CTL}$ according to the result of detection; absolute position detecting means 7 and 12 for subjecting the tape-shaped recording medium 1 to reproduction, to provide absolute position data $DT_{TC}$; reference position data storing means 13A through 19A and 13B through 19B for storing the relative position data $DT_{CTL}$ and absolute position data $DT_{TC}$ for predetermined reference points; and tape position data generating means 22 in which, with respect to an arbitrary point, first tape position data $TT_{CTL1}$ is detected by using the relative position data $DT_{CTL}$, tape movement data from each reference point to the arbitrary point which is obtained by using the absolute position data $DT_{TC}$ is added to the absolute position data $DT_{CTL}$ of the reference point to detect second tape position data $TT_{CTL2}$, and when the difference $\Delta TT$ between the first and second tape position data $TT_{CTL1}$ and $TT_{CTL2}$ is out of a predetermined range the first tape position data $TT_{CTL1}$ is transmitted as an tape position data output $P_{TAPE}$, whereas when the difference $\Delta TT$ is in the predetermined range, the second tape position data $TT_{CTL2}$ is transmitted as the tape position data output $P_{TAPE}$.

In the tape position detecting device of the invention, the relative position data $DT_{CTL0}$ through $DT_{CTL2}$ and absolute position data $DT_{TC0}$ through $DT_{TC2}$ of the reference points are stored, and with respect to the arbitrary point, the first tape position data $TT_{CTL1}$ is detected by using the relative position data $DT_{CTL}$, and the tape movement data from a reference point to the arbitrary point which is obtained using the absolute position data $DT_{TC}$ is added to the absolute position data $DT_{CTL}$ of the reference point to detect the second tape position data $TT_{CTL2}$, and depending on the difference $\Delta TT$ between the first and second tape position data $TT_{CTL1}$ and $TT_{CTL2}$, the first or second tape position data $TT_{CTL1}$ or $TT_{CTL2}$ is transmitted as an tape position data output $P_{TAPE}$. Hence, in this case, the tape position data $P_{TAPE}$ can be detected much more accurately than in the case where it is detected by using the relative position data $DT_{CTL}$ or absolute position data $DT_{TC}$ only.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 3A-3D are timing charts for a description of a conventional tape position detecting method;

FIG. 5 is a flow chart for a description of a tape position data calculating procedure practice by the tape position detecting device of the invention; and FIGS. 6A and 6B are timing charts for a description of a tape position detection carried out by the tape position detecting device of the invention.

DETAILED DESCRIPTION OF THE INVENTION

Preferred embodiments of this invention will be described with reference to the accompanying drawings.

(1) First Embodiment

Figure 2:
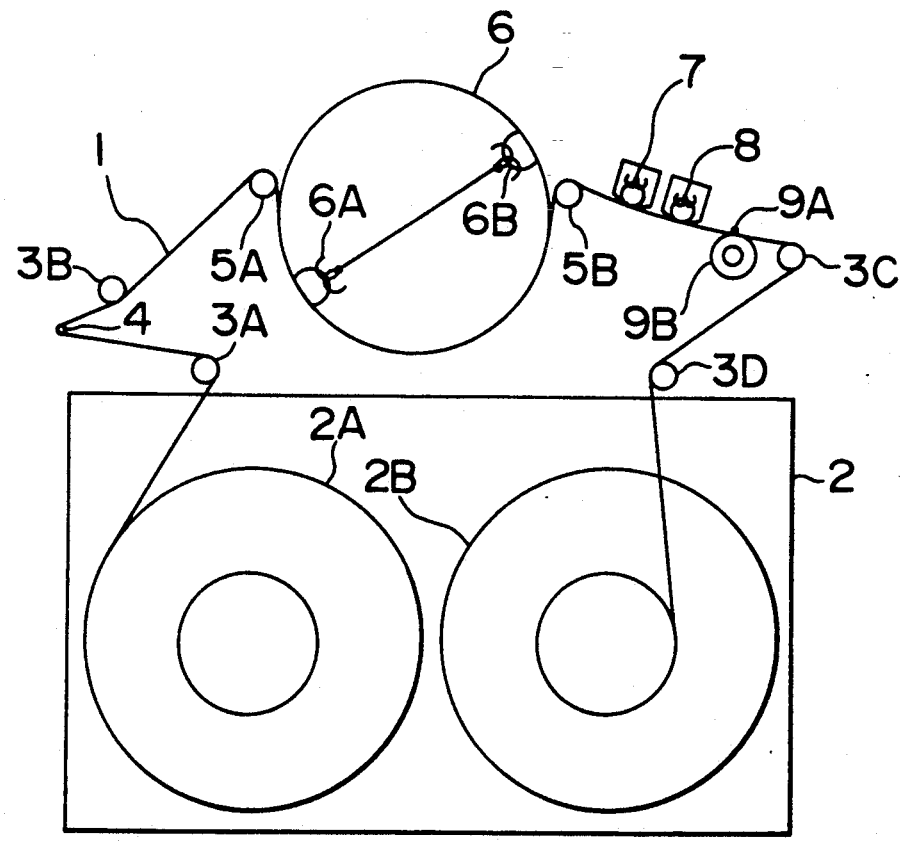
FIG. 2 is an explanatory diagram showing a magnetic tape running path.
Figure 4:
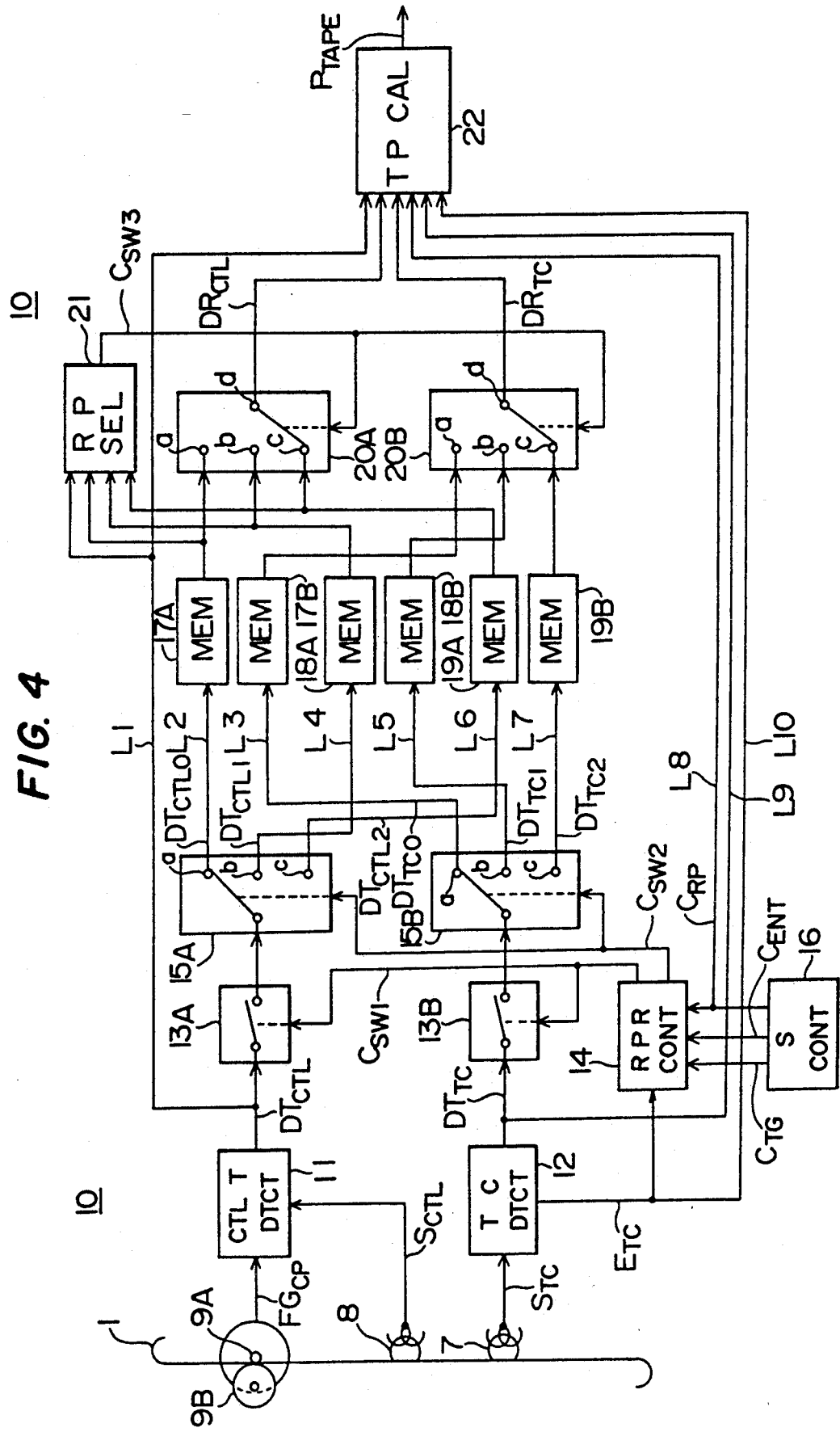
FIG. 4 is a block diagram showing one example of a tape position detecting device according to this invention.

In FIG. 4, in which parts corresponding functionally to those which have been described with reference to FIG. 2 are designated by the same reference numerals or characters, reference numeral 10 designates a tape position detecting device according to the invention. A frequency signal $FG_{CP}$ obtained by detection of the rotation of the capstan 9A adapted to drive the magnetic tape 1, and a CTL pulse signal $S_{CTL}$ provided by the CTL head 8 are applied to a CTL timer detecting circuit 11.

Figure 1:
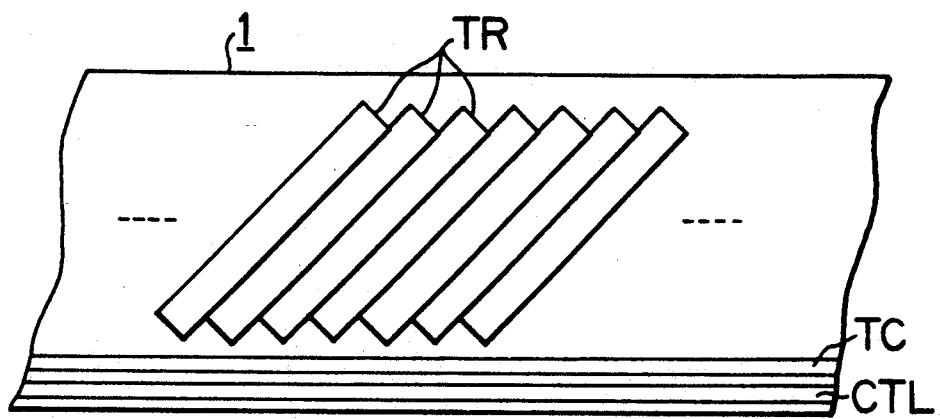
FIG. 1 is an explanatory diagram showing a track format on a magnetic tape.

The CTL timer detecting circuit 11, according to the frequency signal $FG_{CP}$ of the capstan 9A and the CTL pulse signal $S_{CTL}$ reproduced from the control track CTL (FIG. 1) of the magnetic tape, produces CTL timer value data $DT_{CTL}$ representing the relative position data of the magnetic tape 1. The CTL timer value data $DT_{CTL}$ thus produced is applied to a first gate circuit 13A.

A time code signal $S_{TC}$, which is reproduced from the time code track TC (FIG. 1) of the magnetic tape 1 with the TC head 7, is applied to a time code detecting circuit 12, which outputs time code data $DT_{TC}$ representing the absolute position data of the magnetic tape 1. The time code data $DT_{TC}$ is applied to a second gate circuit 13B.

The time code detecting circuit 12 monitors the time code signal $S_{TC}$ for continuity at all times, and outputs a time code discontinuity detection signal $E_{TC}$ upon detection of a discontinuous time code signal $S_{TC}$. The time code discontinuity detection signal $E_{TC}$ is applied to a reference point record control circuit 14.

In practice, the first and second gate circuits 13A and 13B, in response to a gate control signal $C_{SW1}$ from the reference point record control circuit 14, gate the CTL timer value data $DT_{CTL}$ and the time code data $DT_{TC}$ with the timing of a desired reference point, so as to transmit these data to first and second memory select circuits 15A and 15B, respectively.

The reference point record control circuit 14 receives a record/reproduction signal $C_{RP}$ (represents whether recorder is in a recording mode or a reproduction mode), a cuing aimed value signal $C_{ENT}$ (represents a point designated by the user, e.g. end of movie, etc.), and a trigger pulse signal $C_{TG}$ from a system control circuit 16 and the time code discontinuity detection signal $E_{TC}$ from the time code detecting circuit 12, to produce the gate control signal $C_{SW1}$ and a memory select signal $C_{SW2}$, which are applied to the gate circuits 13A and 13B and to the memory select circuits 15A and 15B, respectively.

In each of the first and second memory select circuits 15A and 15B, the armature is tripped over to three output terminals "a", "b" and "c" one after another in response to the memory select signal $C_{SW2}$ provided by the reference point record control circuit 14, so that the CTL timer value data $DT_{CTL}$ and time code data $DT_{TC}$ applied thereto are stored, as CTL timer value data $DT_{CTL0}$ and $DT_{TC0}$, $DT_{CTL1}$ and $DT_{TC1}$, and $DT_{CTL2}$ and $DT_{TC2}$, in first, second and third memory pairs 17A and 17B, 18A and 18B, and 19A and 19B, respectively. In other words, the first, second and third memory pairs are selectively loaded one after another, as needed, to record timer value data $DT_{CTL}$ and time code data $DT_{TC}$ at certain reference points (e.g., at the point where the discontinuity signal $E_{TC}$ indicates that the time code data has become unreadable, or when a cuing signal $C_{ENT}$ is received from the system control circuit 16).

In practice, the CTL timer value data $DT_{CTL0}$ and $DT_{TC0}$, $DT_{CTL1}$ and $DT_{TC1}$, and $DT_{CTL2}$ and $DT_{TC2}$ stored in the first, second and third memory pairs 17A and 17B, 18A and 18B and 19A and 19B in correspondence to the first, second and third reference points are read out at predetermined time intervals, so that they are applied to the input terminals "a", "b" and "c" of first and second reference point switch circuits 20A and 20B. More specifically, the CTL timer value data $DT_{CTL0}$ through $DT_{CTL2}$ are applied to the input terminals "a", "b" and "c" of the first reference point switch circuit 20A, and the time code data $DT_{TC0}$ through $DT_{TC2}$ are applied to the input terminals "a", "b" and "c" of the second reference point switch circuit 20B.

In each of the first and second reference point switch circuits 20A and 20B, the armature is tripped over to the input terminal "a", "b" or "c" in response to a reference point select signal $C_{SW3}$ provided by the reference point select circuit 21. As a result, the CTL timer value data $DT_{CTL0}$, $DT_{CTL1}$ or $DT_{CTL2}$ selected and the time code data $DT_{TC0}$, $DT_{TC1}$ or $DT_{TC2}$ selected are applied, as reference point CTL time value data $DR_{CTL}$ and time code data $DR_{TC}$, to a tape position calculating circuit 22 including a microcomputer with a CPU.

The reference point select circuit 21 receives the CTL time value data $DT_{CTL}$ which is outputted by the CTL timer detecting circuit 11 to represent the relative position data of the magnetic tape 1 at the present position, and the CTL time value data $DT_{CTL0}$, $DT_{CTL1}$ and $DT_{CTL2}$ corresponding to the first, second and third reference points which are stored in the first, second and third memory pairs 17A and 17B, 18A and 18B, and 19A and 19B.

As a result, the reference point select circuit 21 applies the reference point select signal $C_{SW3}$ to the first and second reference point switch circuit 20A and 20B which selects the input terminal "a", "b" or "c" to which, of the CTL time value data $DT_{CTL0}$, $DT_{CTL1}$ and $DT_{CTL2}$, the closest to the CTL timer value data $DT_{CTL}$ of the present position is applied. In other words, the circuit 21 will compare the reference points $DT_{CTL0}$, $DT_{CTL1}$ and $DT_{CTL2}$ stored in the first, second and third memory pairs, to the present relative position data $DT_{CTL}$, and cause the switch circuits 20A and 20B to select the input terminal corresponding to the memory pair having data most closely matched to the present timer value data $DT_{CTL}$.

In the embodiment, the tape position calculating circuit 22 receives the CTL timer value data $DR_{CTL}$ and time code data $DR_{TC}$ of the reference point, the CTL timer value data $DT_{CTL}$ representing the relative position data of the magnetic tape 1 at the present position and the time code data $DT_{TC}$ representing the absolute position data thereof, the time code discontinuity detection signal $E_{TC}$ representing the detection of the discontinuous time code signal $S_{TC}$, and the record/reproduction signal $C_{RP}$ outputted by the system control circuit 16.

The tape position calculating circuit 22 utilizes these data and signals to practice a tape position data calculating procedure RTO as shown in FIG. 5, thereby to output the tape position data $P_{TAPE}$ of the magnetic tape at the present position.

In the tape position calculating circuit 22, the CPU starts practicing the tape position data calculating procedure RTO, and operates as follows: In Step SP1, the tape movement data represented by the CTL timer value data $DT_{CTL}$ of the present position is added to or subtracted from the previous tape position data $P_{TAPE}$, so that a first CTL timer value $TT_{CTL1}$ is calculated similarly as in the case of the third tape position detecting method.

In Step SP2, the difference between the time code data $DT_{TC}$ of the present position and the time code data $DR_{TC}$ of the reference point is added to or subtracted from the CTL timer value data $DR_{CTL}$ of the reference point, to detect a second CTL timer value $TT_{CTL2}$.

In Step SP3, the difference $\Delta TT$ between the first and second CTL timer values $TT_{CTL1}$ and $TT_{CTL2}$ is calculated.

Thereafter, in Step SP4, it is determined whether or not the difference $\Delta TT$ is equal to or smaller than a predetermined value (five seconds in the embodiment). When the difference is smaller than the predetermined value (YES), then in Step SP5 it is determined from the time code discontinuity detection signal $E_{TC}$ whether or not the time code $DT_{TC}$ has been read correctly.

When it is determined that the time code $DT_{TC}$ has been read correctly (YES), then in Step SP6 it is determined from the record/reproduction signal $C_{RP}$ provided by the system control circuit 16 whether or not a recording operation is being carried out. When it is determined that the recording operation is not being carried out (NO), then in Step SP7 the second CTL timer value $TT_{CTL2}$ is transmitted as the tape position data $P_{TAPE}$ of the present position. And in Step SP8 the tape position data calculating procedure RTO is ended.

In the case where in Step SP4 or SP5 the result of determination is negative (NO), or in Step SP6 the result of determination is positive (YES), Step SP9 is effected so that the first CTL timer value $TT_{CTL1}$ is transmitted as the tape position data $P_{TAPE}$ of the present position. And In Step SP8 the tape position data calculating procedure RTO is ended.

It is assumed that, as shown in FIGS. 6A and 6B, in the case where the time code data $DR_{TC}$ and CTL timer value data $DR_{CTL}$ of a reference point to are ten (10) minutes and three (3) minutes, respectively, fifteen (15) minutes and twelve (12) seconds, and eight (8) minutes and ten (10) seconds are detected as the time code date $DR_{TC}$ and CTR timer value data $DR_{CTL}$ of the present position $t_1$, respectively.

Under this condition, the first CTL timer value $TT_{CTL1}$ obtained in Step SP1 is eight (8) minutes and ten (10) seconds similarly as in the case of the CTL timer value data $DT_{CTL}$, while the second CTL timer value $TT_{CTL2}$ obtained in Step SP2 is as follows:

$$TT_{CTL2} = DR_{CTL} + DT_{TC} - DR_{TC} \quad (1)$$
$$= 3 \text{ min.} + 15 \text{ min. } 12 \text{ sec.} - 10 \text{ min.}$$
$$= 8 \text{ min. } 12 \text{ sec.}$$

Hence, the difference $\Delta TT$ between the first and second CTL timer values $TT_{CTL1}$ and $TT_{CTL2}$ is two (2) seconds.

Therefore, in the case where the time code data $DT_{TC}$ is read correctly and no recording operation is being carried out, it is determined that the difference $\Delta TT$ of two (2) seconds is the error of the CTL timer value data, and the second CTL timer value $TT_{CTL2}$, or eight (8) minutes and twelve (12) seconds, is transmitted as the tape position data $P_{TAPE}$ of the present position $t_1$.

On the other hand, in the case where fifteen (15) minutes and twelve (12) seconds, and eight (8) minutes and twenty (20) seconds are detected as the time code data $DT_{TC}$ and CTL timer value data $DT_{CTL}$ of the present position $t_1$, respectively, the first CTL timer value $TT_{CTL1}$ is eight (8) minutes and twenty (20) seconds, while the second CTL timer value $TT_{TCL2}$ is eight (8) minutes and twelve (12) seconds similarly as in the above-described case.

Therefore, the difference $\Delta TT$ between the first and second CTL timer values $TT_{CTL1}$ and $TT_{CTL2}$ is eight (8) seconds. In this case, it is determined that the time code data $DT_{TC}$ is discontinuous. As a result, the first CTL timer value $TT_{CTL1}$, or eight (8) minutes and twenty (20) seconds, is outputted as the tape position data $P_{TAPE}$ of the present position $t_1$.

Thus, in the tape position detecting device, first the CTL timer value data $DR_{CTL}$ and time code data $DR_{TC}$ of a predetermined reference point are stored; and the first CTL timer value of the present position represented by the CTL timer value data $DT_{CTL}$, and the second CTL timer value $TT_{CTL2}$ are detected. The second CTL timer value $TT_{CTL}$ is obtained by adding the tape movement data, which is obtained by subtracting the time code data $DR_{TC}$ of the reference point from the time code data $DT_{TC}$ of the present position, to the CTL timer value data $DR_{CTL}$ of the reference point. When the difference $\Delta TT$ between the first and second CTL timer values $TT_{CTL1}$ and $TT_{CTL2}$ is longer than five (5) seconds, the first CTL timer value $TT_{CTL1}$ is outputted as the tape position data $P_{TAPE}$. When the difference $\Delta TT$ is equal to or shorter than five (5) seconds, the second CTL timer value $TT_{CTL2}$ is outputted as the tape position data $P_{TAPE}$. Thus, in this case, the tape position data $P_{TAPE}$ of the present position can be detected with higher accuracy than in the case where the tape position data is obtained by using only the CTL timer value data $DT_{CTL}$ or time code data $DT_{TC}$.

That is, in the tape position detecting device 10 of the invention, the CTL timer value data $DT_{CTL}$ representing the relative position data is interpolated with the time code data $DT_{TC}$ representing the absolute position data, to obtain the tape position data $P_{TAPE}$. Hence, the tape position detecting device 10 thus designed is higher both in stability and in accuracy than the prior art.

Thus, by utilizing the tape position data $P_{TAPE}$ provided by the tape position detecting device 10, a video tape recorder can be realized which can achieve the cuing operation with higher accuracy than a conventional one.

(2) Other Embodiments (2-1) In the above-described embodiment, the CTL timer value data $DT_{CTL}$ and the time code data $DT_{TC}$ are stored with the record/reproduction starting timing, the cuing aimed value setting timing, the time code discontinuity detecting timing, or the timing occurring at predetermined time intervals as a reference point; however, the reference point setting timing is not limited thereto or thereby; that is, it may be selected in various manners as the case may be.

(2-2) Furthermore, in the above-described embodiment, the data on three reference points are stored, and the reference point closest to the present position is selected. However, it should be noted that the number of reference points is not limited to three; that is, it can be determined freely, for instance, according to the capacity of memory.

(2-3) In the above-described embodiment, the tape position data in the video tape recorder is detected; however, the invention is not limited thereto or thereby. That is, the tape position detecting device of the invention can be applied effectively to a variety of tape recorders having a tape-shaped recording medium on which absolute position data is recorded.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A tape position detecting device which comprises:
    relative position detecting means for detecting an amount of movement of a tape-shaped recording medium, and providing relative position data according to the result of detection;
    absolute position detecting means for detecting a means on said tape-shaped recording medium to produce absolute position data;
    reference position data storing means for storing said relative position data and said absolute position data for predetermined reference points; and
    tape position data generating means in which, with respect to an arbitrary point, first tape position data is generated using said relative position data, second tape position data is generated using the difference between said absolute position data of said arbitrary point and said absolute position data of said reference point added to or subtracted from said relative position data of said reference point, and when the difference between said first and second tape position data is out of a predetermined range, said first tape position data is transmitted as a tape position data output, whereas when said difference is in said predetermined range, said second tape position data is transmitted as said tape position data output.

2. A tape position detecting device according to claim 1, said tape-shaped recording medium being a video tape of a video tape recorder.

3. A tape position detecting device according to claim 1, said relative position detecting means detecting control pulse signals recorded on a control track formed longitudinally on said tape-shaped recording medium.

4. A tape position detecting device according to claim 1, said absolute position detecting means detecting a time code recorded on a time code track which is formed on said tape-shaped recording medium, said time code representing the absolute position of a record track on the said tape-shaped recording medium.

5. A tape position detecting device according to claim 2, said absolute position detecting means detecting a time code being superposed on the vertical flyback time part of the video signal recorded on a record track of said video tape.

* * * * *